United States Patent [19]
Knodell et al.

[11] Patent Number: 5,971,626
[45] Date of Patent: Oct. 26, 1999

[54] FIBER OPTIC CONNECTOR AND CONNECTOR SLEEVE ASSEMBLY

[75] Inventors: Thomas G. Knodell; Michael de Jong, both of Fort Worth, Tex.

[73] Assignee: Siecor Corporation, Hickory, N.C.

[21] Appl. No.: 08/920,597

[22] Filed: Aug. 29, 1997

[51] Int. Cl.$^6$ ..................................................... G02B 6/38
[52] U.S. Cl. ............................................................. 385/60
[58] Field of Search .................................. 385/60, 61, 62, 385/66, 67, 68, 72, 78, 79, 80, 81, 84

[56] References Cited

U.S. PATENT DOCUMENTS

| | | | |
|---|---|---|---|
| 4,762,388 | 8/1988 | Tanaka et al. | 350/96.2 |
| 4,767,181 | 8/1988 | McEowen | 350/96.21 |
| 5,117,528 | 6/1992 | Kanayama et al. | 385/147 |
| 5,751,875 | 5/1998 | Edwards et al. | 385/84 |
| 5,796,894 | 8/1998 | Csipkes et al. | 385/56 |

*Primary Examiner*—Hung N. Ngo

[57] ABSTRACT

The present invention provides a connector and connector sleeve assembly comprising a connector with reduced parts that is received in one side of the connector sleeve. The connector has a bayonet style protrusion that is received in a bayonet cut-out in the connector sleeve. The other side of the connector sleeve is configured to receive a standard connector design such as an SC connector or an ST type connector. The connector has an enlarged portion for being gripped by fingers such that the reduced part connector can be readily connected and disconnected from the connector sleeve in tight spaces.

24 Claims, 5 Drawing Sheets

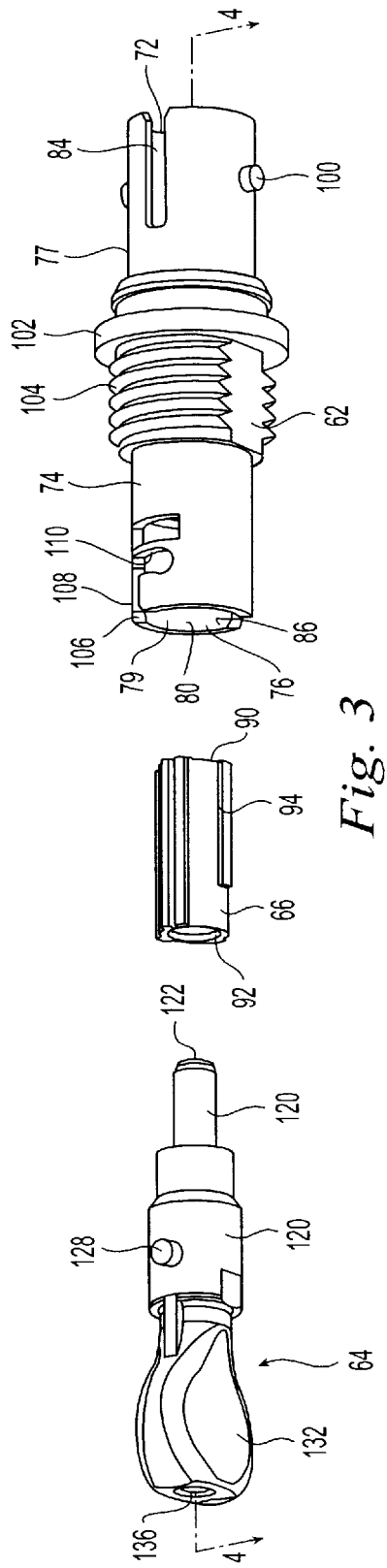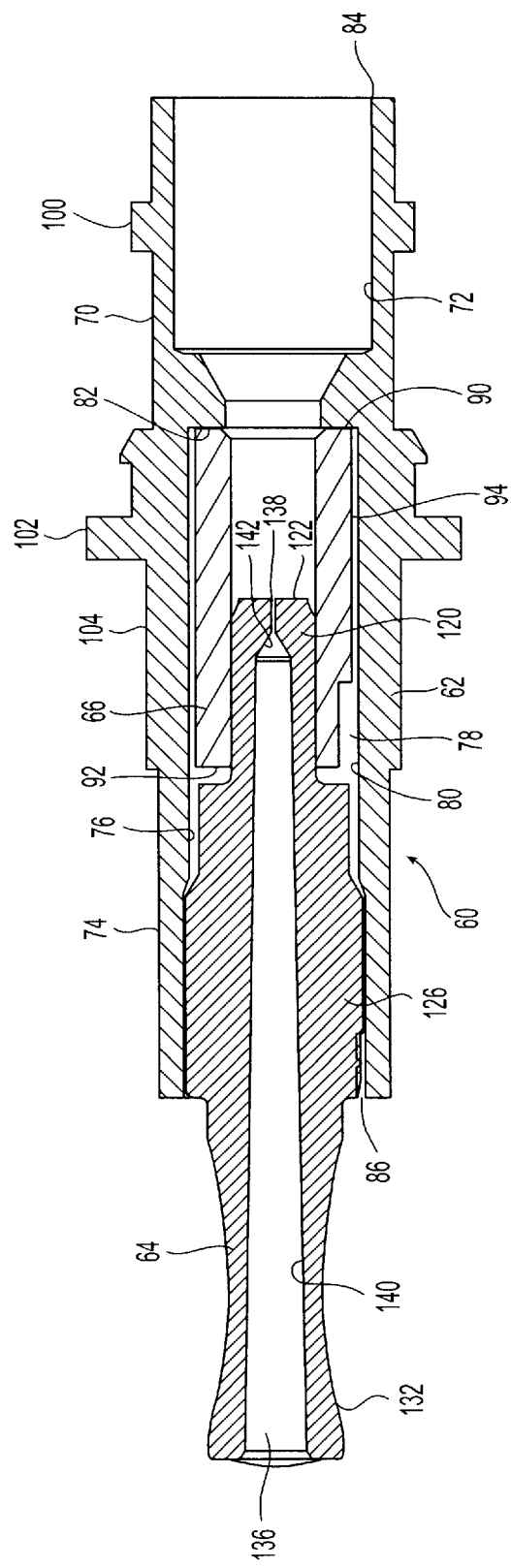

FIBER OPTIC CONNECTOR AND CONNECTOR SLEEVE ASSEMBLY

FIELD OF THE INVENTION

The present invention relates to a fiber optic connector and connector sleeve assembly. In one aspect, the present invention relates to a reduced part fiber optic connector and a connector sleeve that receives the reduced part connector in one side and a conventional connector in the other side.

BACKGROUND OF THE INVENTION

The use of conventional fiber optic connectors such as SC connectors and ST type connectors are commonplace in fiber optic networks. As fiber distribution frames, panels, modules and other fiber optic hardware are developed for fiber optic networks, it is sometimes necessary to provide this hardware with SC or ST type connector sleeves to receive an SC or ST connector from an optical fiber or jumper to be connected to the hardware. When an SC or ST connector sleeve is so used, then the connector on the inside of the hardware typically must also be an SC or ST type. This is because the SC and ST connector sleeves are symmetrical in that they receive the same type of connector in each end of the connector sleeve.

The main advantage of SC and ST type connectors is their ease of connecting and disconnecting and resistance to pulling. Such advantages are needed on the outside of a piece of hardware where the optical fiber or jumper may be connected and disconnected several times and exposed to a risk of being snagged. However, on the inside of the hardware, often times the connector will not be removed from the connector sleeve for the life of the hardware. Also, the inside of the hardware is typically isolated from a risk of a pull against the connector. One downside of the SC and ST type connectors is their cost. They are made of several pieces that are assembled together to achieve the push pull or bayonet style connection and disconnection. Accordingly, the cost of hardware and particularly the connector sleeve/connector assembly could be reduced by making an asymmetrical assembly with a simpler connector and connector sleeve port for the interior side that may not have the advantages of the conventional SC or ST type connectors but is suitable for the interior of fiber optic hardware. The exterior half of the connector sleeve would still receive the conventional connector on the outside.

It has been found that NTT has proposed an asymmetrical connector sleeve/connector assembly for the SC style connector. See, for example, Japanese Publication Number 08248263. The conventional SC connector sleeve has one half that has the conventional latch arms to receive the conventional SC connector and the other half has a another pair of latch arms that couple with the simplified connector. The simplified connector has a square shaped flange that is received in the latch arms. The NTT design suffers from two main drawbacks. First, the removal of the simplified plug requires a special tool. The use of a tool is impractical in certain types of hardware where there is insufficient space to maneuver a tool into position to remove the simplified plug. Secondly, the NTT design does not appear to take into consideration other conventional connectors such as the ST type connector. Therefore a need still exists for a reduced part asymmetrical connector sleeve/connector assembly that does not require special tools for removal of the reduced part connector and that provides for a universal reduced part connector.

SUMMARY OF THE INVENTION

The present invention provides a universal reduced part connector that is readily connected and disconnected by fingers to one side of a connector sleeve that receives a standard connector in its other side. In one aspect of the present invention, a connector and connector sleeve assembly is provided comprising a connector sleeve with a first half and a second half and a ferrule alignment portion spanning from the first half to the second half. The first half is configured to operatively connect and disconnect with a first fiber optic connector of a first design. The second half of the connector sleeve has a cylindrical sleeve portion defining a second receptacle. The assembly has a second connector having a second design that is different from the first design. The second connector has an optical fiber ferrule portion and a body portion rearward of the face of the ferrule, the body portion and the ferrule portion being fixed relative to each other. The body portion is removably engaged with the sleeve portion of the second receptacle such that the end face of the ferrule portion is disposed in the ferrule alignment portion of the connector sleeve and fixed relative to the connector sleeve. The body portion has an enlarged portion grippable by fingers such that the second connector is readily removable from the second receptacle without a tool.

Another aspect of the present invention provides a fiber optic connector comprising a ferrule portion having an end face and defining a ferrule bore longitudinally therethrough to receive an optical fiber for termination at the end face. The connector has a body portion rearward of the end face of the ferrule and fixed to the ferrule portion. The body portion has an enlarged portion of a generally tab shape to facilitate gripping of the enlarged portion by fingers. The body portion defines an axial passageway therethrough that communicates with the ferrule bore to receive an optical fiber therethrough for insertion into the ferrule bore.

In a further aspect of the present invention, the connector and the sleeve portion of the connector sleeve connect to each other with a bayonet connection. The sleeve portion has a bayonet cut-out that receives a protrusion on the body portion of the connector. The present invention provides a connector and connector sleeve assembly that has few parts and is less expensive to manufacture that a conventional connector and conventional connector sleeve yet the assembly is connectable to a conventional connector on the other side of the connector sleeve. The assembly of the present invention can be used in applications where the added features of the standard connector designs are not needed on one side of the connector sleeve and thus provide a cost savings. Additionally the connector is readily connected and disconnected without use of a tool and can be used with different modified connector sleeves to mate with more than one type of standard connector.

BRIEF DESCRIPTION OF THE DRAWINGS

FIG. 3 is an exploded perspective view of the preferred embodiment of the connector and connector sleeve assembly of the present invention;

FIG. 4 is a longitudinal cross-section of the assembly of FIG. 3 taken along line 4—4;

DETAILED DESCRIPTION OF THE PREFERRED EMBODIMENTS

Figure 1:
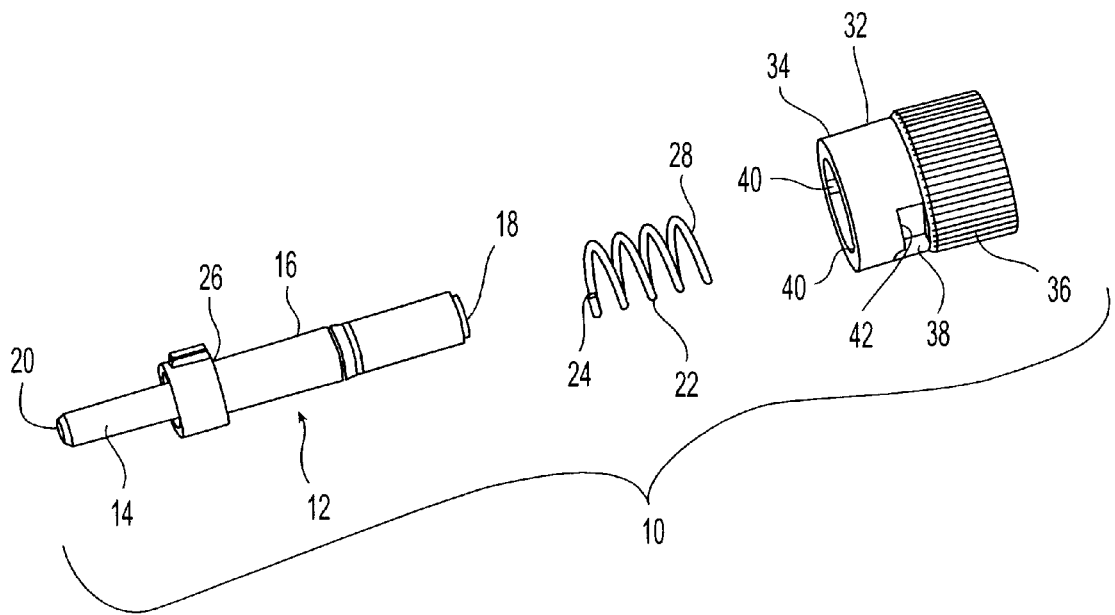
FIG. 1 is an exploded perspective view of a prior art ST type connector.

With reference to FIG. 1 a typical prior art ST type connector 10 is shown with ferrule and holder assembly 12 which has ferrule 14 retained in holder 16. Holder 16 has fiber end 18 where an optical fiber (not shown) is threaded through and any sheath of the optical fiber can be attached by crimping or other suitable strain relief technique as is well known in the art of connectorizing optical fibers. The fiber terminates at end face 20 of ferrule 14. Connector 10 also has spring 22 with first end 24 that abuts against collar 26 on assembly 12 and second end 28 opposite thereto. Connector 10 has bayonet housing 32 with first end 34 and second end 36 opposite thereto. Bayonet housing 32 has a shoulder (not shown) extending radially inward against which second end 28 of spring 22 abuts on one side and against which a boot (not shown) that is dressed on the fiber abuts on the other side. The bayonet housing 32 can move in the axial direction relative to ferrule 14 by compressing spring 22. Bayonet housing 32 has diametrically opposed bayonet cut-outs 38 which have an axial groove portion 40 on the inside of bayonet housing 32 and a circumferential portion 42.

Figure 2:
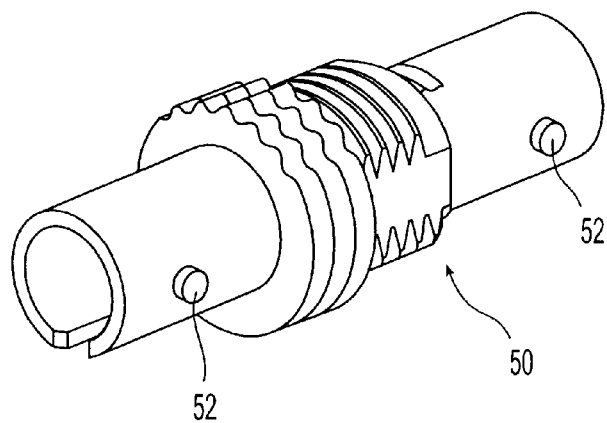
FIG. 2 is a perspective view of a prior art connector sleeve for mating two ST type connectors.

With reference to FIG. 2 a typical prior art connector sleeve 50 for ST type connectors is shown. Connector sleeve 50 receives two ST type connectors so that the end faces 20 of the ferrules of the connectors abut at a point in the middle area of the sleeve in an alignment sleeve (not shown). When a connector is inserted, axial groove portions 40 of bayonet cut-outs 38 of the connectors slide over protrusions 52 and then when the protusions reach circumferential portion 42, bayonet housing 32 is rotated until protrusions 52 are disposed in circumferential portions 42 thereby fixing bayonet housing 32 relative to connector sleeve 50. With bayonet housing 32 fixed relative to connector sleeve 50, ferrule 14 can move relative to connector sleeve 50 in the axial direction against the bias force of spring 22. Connector sleeve 50 as described above and its coupling of ST type connectors is known in the art.

Figure 5:
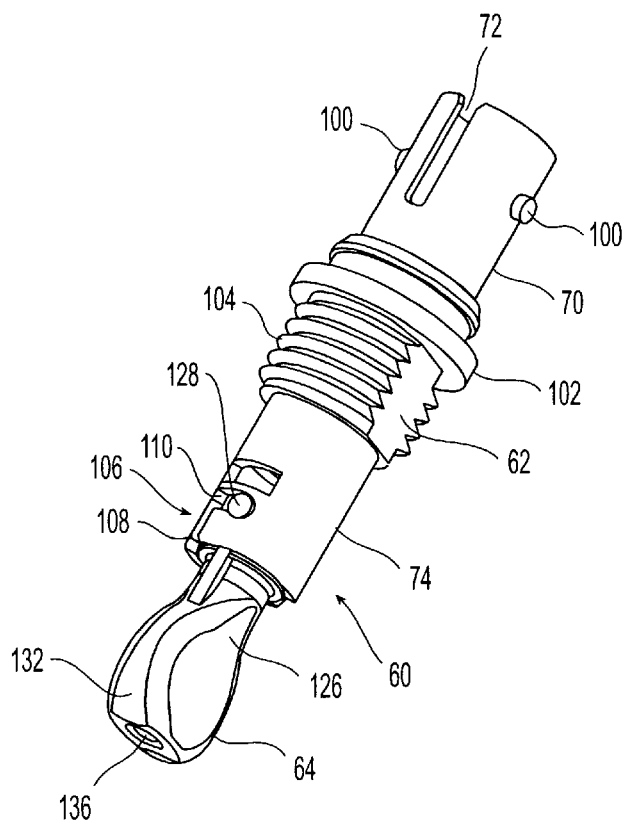
FIG. 5 is a perspective view of the assembly of FIG. 4.

With reference to FIGS. 3–5, the preferred embodiment of the connector sleeve/connector assembly 60 of the present invention is shown for receiving an ST type connector as shown in FIG. 1. Assembly 60 comprises connector sleeve 62 and connector 64 as well as alignment sleeve 66. Alignment sleeve 66 may be of the type used with the conventional ST type connector sleeve of FIG. 2 but which is not shown in FIG. 2. Alignment sleeves are well known in the art of fiber optic connectors for aligning two ferrule end faces relative to each other with sufficient preciseness and may be of a split sleeve design or any of a variety of other designs.

Connector sleeve 62 in this embodiment of the present invention has first half 70 with first receptacle 72 for receiving a standard ST type connector as is known in the art and as described above with respect to FIGS. 1 and 2. Connector sleeve 62 has second half 74 with second receptacle 76. Connector sleeve 62 has alignment area 78 in between the first and second receptacles for having alignment sleeve 66 disposed therein. The first and second receptacles with the alignment area in between constitute a continuous passageway 79 through connector sleeve 62 defined by inside surface 80 of connector sleeve 62. Between first receptacle 72 and alignment area 78, inside surface 80 defines shoulder surface 82 facing axially toward second receptacle 76. Passageway 79 extends from first end 84 to second end 86.

Alignment sleeve 66 has first end 90 that is disposed opposite shoulder surface 82 inside connector sleeve 62 and second end 92 that is opposite thereto. Alignment sleeve also has outer surface 94. The portion of passageway 79 from shoulder surface 82 to second end 86 of passageway 79 is dimensioned such that alignment sleeve 66 can be slidably received through second end 86 into alignment area 78. Alignment sleeve 66 is preferably a composite slitted sleeve of molded glass filled thermoplastic such as Ultem or Radel for multi-mode applications.

The exterior of first half 70 has protrusions 100 just as protrusions 52 in FIG. 2. Connector sleeve also has flange 102 and adjacent threads 104 for screwing connector sleeve 62 into a panel or other item as is commonly known with the conventional connector sleeve of FIG. 2.

Second half 74 is different from the conventional connector sleeve of FIG. 2 in that it does not have a protrusion but instead has bayonet cut-out 106 with axially extending portion 108 and circumferentially extending portion 110. The configuration of bayonet cut-out 106 is similar to the configuration of bayonet cut-out 38 of bayonet housing 32 of FIG. 1. Second receptacle 76 is sized to receive connector 64 as well as allow alignment sleeve 66 to slide therethrough.

Connector 64 shown in FIGS. 3–5 is a one-piece polymer ferrule that is suitable for multi-mode fiber optic applications. Connector 64 has ferrule portion 120 with an outer diameter of a conventional ferrule and is slidably received within alignment sleeve 66. Ferrule portion has end face 122 at which an optical fiber is terminated as is with a conventional ferrule. Connector 64 has body portion 126 adjacent ferrule portion 120 which has bayonet protrusion 128 which is sized to slide into bayonet cut-out 106 of second half 74 of connector sleeve 62 to fix connector 64 relative to connector sleeve 62. Since body portion 126 and ferrule portion 120 are fixed relative to each other, ferrule portion 120 is generally fixed relative to connector sleeve 62. Body portion 126 has gripping portion 132 that is disposed outside of second receptacle 76 when connector 64 is inserted into connector sleeve 62. Gripping portion 132 is generally tab shaped to facilitate its being gripped by fingers to connect and disconnect connector 64 from connector sleeve 62.

Connector 64 defines passageway 136 therethrough with bore portion 138 extending back from end face 122 to large diameter portion 140. Bore portion 138 is sized to receive a portion of optical fiber therethrough stripped from an optical fiber cable or jumper and large diameter portion 140 is sized to accommodate jacketing or sheathing of the fiber. Passageway 136 can have a taper portion 142 to transition from large diameter portion 140 to bore portion 138 to help guide the fiber into the bore portion 138. Connectorization of connector 64 to a fiber may be performed by any of a variety of methods as are known in the art of connectorization. The manner of connectorization forms no part of the present invention.

In the preferred installation of assembly 60, alignment sleeve 66 is slid over ferrule portion 120 of connector 64. Then gripping portion 132 of connector 64 is gripped by an installer's fingers and alignment sleeve is inserted into and through second receptacle 76 while bayonet protrusion 128 is guided into axially extending portion 108 of bayonet cut-out 106. Then gripping portion is turned to rotate bayonet protrusion 128 through circumferentially extending portion 110 of bayonet cut-out 106 to axially fix ferrule portion 120 relative to connector sleeve 62 while connected. When a standard ST type connector such as connector 10 of FIG. 1 is desired to be inserted into first receptacle 72, it is simply connected as is standard to first half 70 and ferrule 14 of such connector (FIG. 1) will slide into alignment sleeve 66 and abut against end face 122 of ferrule portion 120. Bayonet housing 32 is then pushed against the bias force of spring 22 until its bayonet cut-out 38 is engaged to protrusion 100 on first half 70. Because ferrule portion 120 is fixed relative to connector sleeve 62, the abutment force between ferrule portion 120 and ferrule 14 is provided solely by spring 22 of connector 10. Disconnection of connector 10 is the same as with standard ST type connectors. It is anticipated that connector 64 would not need to be disconnected; however if disconnection is needed to clean connector 64, it is readily achieved by rotating and sliding bayonet protrusion 128 out of bayonet cut-out 106 to allow connector 64 to be retracted from connector sleeve 62.

Figure 6:
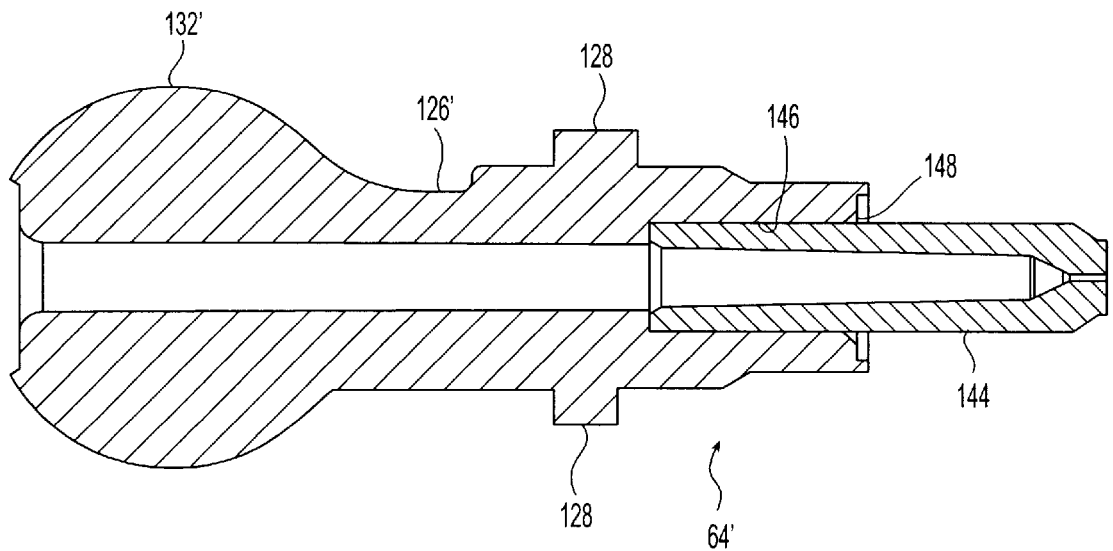
FIG. 6 is a cross-section of an alternative embodiment of the connector of the present invention.

The one-piece connector 64 is preferably made of Ultem or Radel for multi-mode applications. However, in alternative embodiments, connector 64 may be made of two pieces if a ceramic or other material ferrule is needed for additional preciseness. With reference to FIG. 6 an alternative embodiment of connector 64' is shown with two pieces but with the same outer envelope as the one piece connector of FIGS. 3–5. Body portion 126' is made of a low cost engineering thermoplastic such as polycarbonate and ferrule 144 is a separate piece preferably made of Ultem or Radel. The plastics like Ultem or Radel lend themselves to higher precision ferrules than the polycarbonate of the body portion. Body portion 126' has ferrule bore 146 to receive ferrule 144 therein. Ferrule bore 146 can have lead in taper 148 to help guide ferrule 144 into ferrule bore 146. Preferably, ferrule 144 is ultrasonically welded in the body portion and alternatively may be glued in ferrule bore 146 with a heat cure epoxy.

Figure 7:
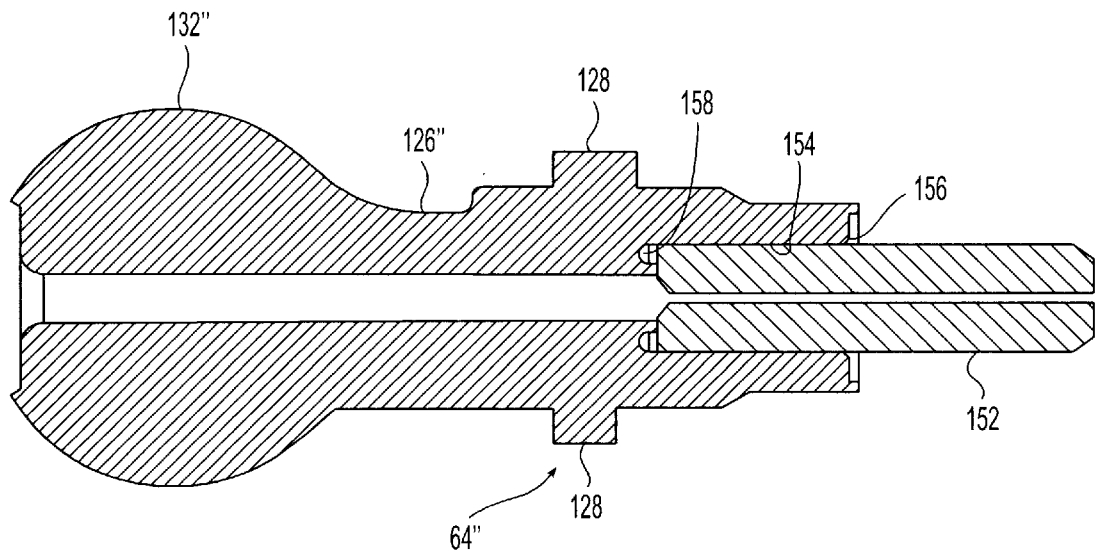
FIG. 7 is a cross-section of another alternative embodiment of the connector of the present invention.

With reference to FIG. 7, a single mode embodiment of connector 64" is shown. In this embodiment, body portion 126" is similar to the embodiment of FIG. 6. Connector 64" has ferrule 152 which is preferably ceramic to provide the precision needed for single mode. Body portion 126" has ferrule bore 154 to receive ferrule 152 therein. Ferrule bore 154 can have lead in taper 156 to help guide ferrule 152 into ferrule bore 154. Ferrule 153 is preferably insert molded into the body portion in this embodiment. In this single mode embodiment, it is preferred that the alignment sleeve be a commonly used split ceramic sleeve instead of the composite slitted sleeve preferably used in multi-mode applications.

Body portion 126' or 126" can receive any type of ferrule by the appropriate sizing of ferrule bores 146 and 154, respectively. Because body portions 126' and 126" having a gripping portion that is sufficiently enlarged to allow gripping by fingers, any need for a special tool is eliminated as well as the potential that a connector could not be removed due to lack of access space for such a tool. Because connector 64 is fixed relative to connector sleeve 62, there is no need for a spring and separate housing piece to attach to the connector sleeve to allow for axial movement of the ferrule. Accordingly, connector 64 is simpler and less expensive to manufacture than the conventional ST type connector.

Figure 8:
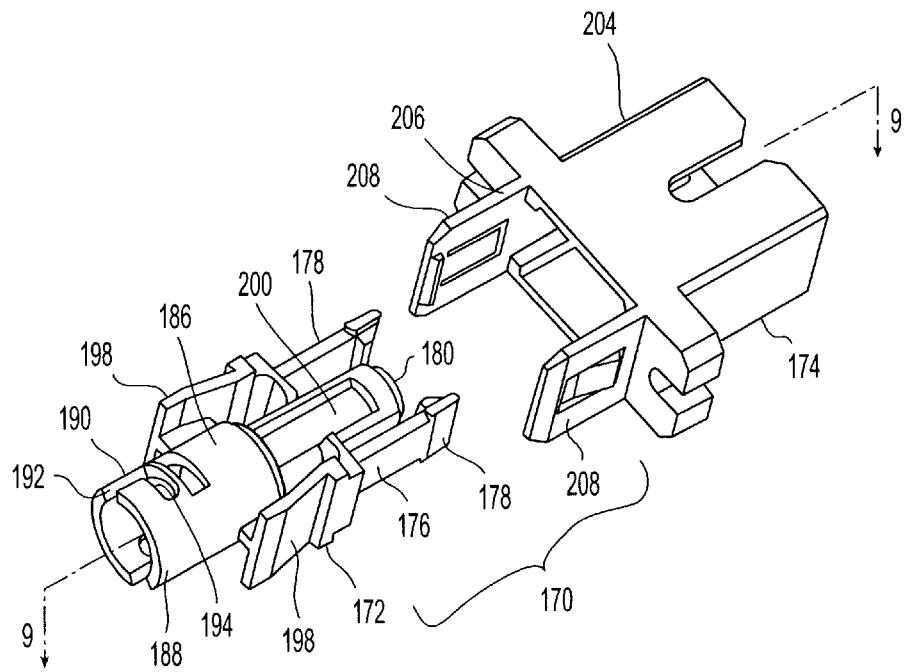
FIG. 8 is an exploded perspective view of an alternative embodiment of the connector sleeve of the present invention.
Figure 9:
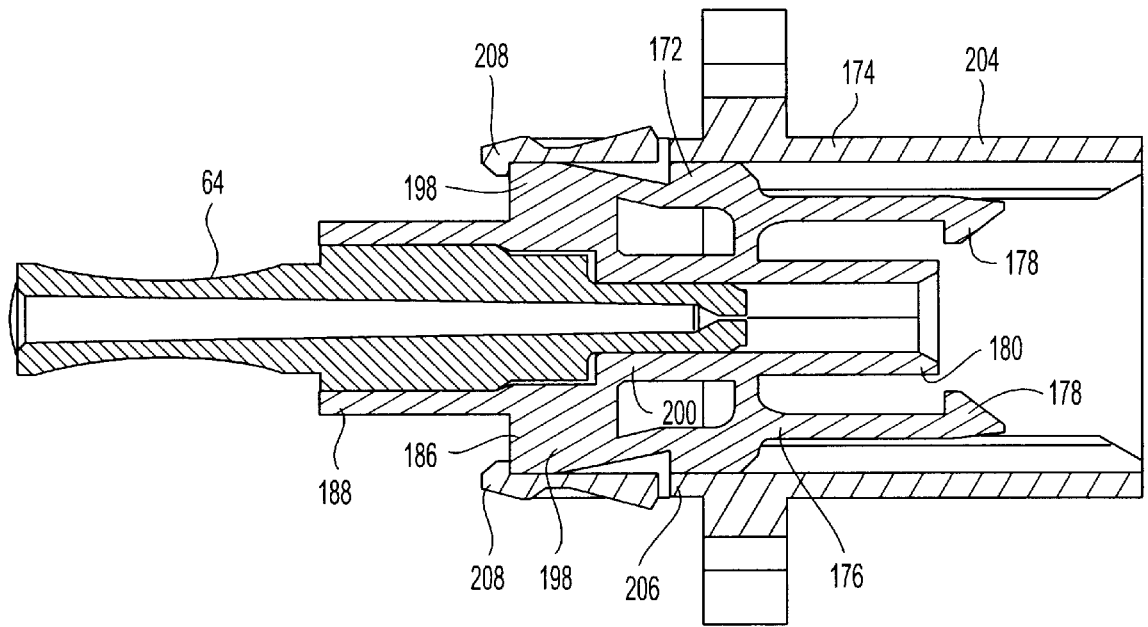
FIG. 9 is a longitudinal cross-section of the connector sleeve of FIG. 8 taken along line 9—9 with a connector of the present invention inserted therein.

With reference to FIGS. 8 and 9, an alternative embodiment of a connector sleeve for use with the connector of the present invention is shown that has one half to receive the simplified connector 64 of the present invention and another half for receiving a standard SC connector. SC connectors are widely used today, and an example of an SC connector is shown in U.S. Pat. No. 5,359,688. FIGS. 1–3 of the '688 patent show a standard SC connector and adapter with the exception of the metallic clips. The SC connector also has a ferrule and ferrule holder assembly that is spring mounted relative to an outer housing so that when the outer housing is engaged with an SC connector sleeve, the ferrule can move in the axial direction relative to the SC connector sleeve against the bias force of the spring. The SC connector sleeve and SC connector have more parts than the ST type connectors and sleeves in order to achieve a strictly push-pull connection without the need for any rotation as with the ST type.

For multi-mode applications, reference is made to this assignee's pending Ser. No. 08/521,700 "Optical Fiber Coupler Including Sleeve with Flexible Flap." This application is incorporated herein by reference. This application shows a one piece inner housing for the SC connector sleeve that includes the latch arms as well as the alignment sleeve as one piece. The need for a separate alignment sleeve was eliminated.

FIGS. 8–9 show connector sleeve 170 with inner housing 172 that is received in outer housing 174. Inner housing 172 has first half 176 with latch arms 178 and alignment sleeve portion 180 just as one half of the inner housing of Ser. No. 521,700. Latch arms 178 are sized and located to engage the housings of an SC connector. Inner housing 172 has second half 186 which has bayonet sleeve portion 188 with bayonet cut-out 190 defined therein with axially extending portion 192 and circumferentially extending portion 194. Bayonet sleeve portion 188 is sized to receive body portion 126 of connector 64 so that bayonet protrusion 128 can slide into engagement with bayonet cut-out 190. Second half 186 also has flange portions 198 to allow for engagement with outer housing 174.

Second half 186 also has alignment sleeve portion 200 that together with alignment sleeve portion 180 of first half 176 of inner housing 172 form an alignment sleeve substantially like that of Ser. No. 521,700.

Outer housing 174 has first half 204 that is the same as a half of a conventional SC connector sleeve outer housing and second half 206 with two outer latch arms 208 to engage flange portions 198 of inner housing 172. It should be understood that the configuration of outer latch arms 208 and flange portions 198 could be any of a variety of configurations as long as they serve to retain the inner housing in the outer housing.

Outer housing 174 is preferably molded as one piece and inner housing 172 is also preferably molded as one piece. Inner housing 172 is then preferably snapped together with outer housing 174 by flexing latch arms 208 around flanges 198. As can be seen by this design, the one piece inner housing is readily inserted into the one piece outer housing in one axial direction. In contrast the conventional SC adapter has two outer housing halves that are welded around two inner housing halves and the spring force of the connectors act over time to cause separation of the housing halves. With the design of the present invention, the inner housing is one piece and thus not susceptible to separation. As assembled, the first halves of the inner and outer housings are substantially as one half of the SC connector sleeve of Ser. No. 521,700. For single mode applications, a ceramic alignment sleeve can be placed within alignment portions 180 and 200 to more precisely align the ferrules of the connectors. Installation of connector 64 in connector sleeve 170 is the same as with the first discussed embodiment with the exception that if a separate alignment sleeve is not needed as shown in Ser. No. 521,700, then there is no step of placing an alignment sleeve onto the ferrule prior to connection.

Figure 10:
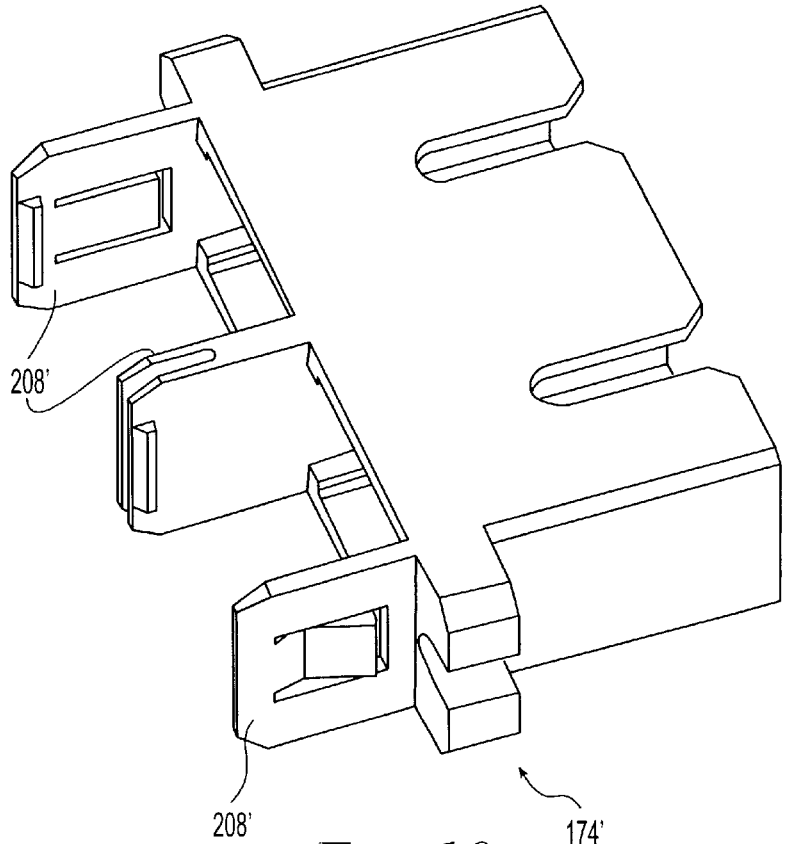
FIG. 10 is a perspective view of an alternative embodiment of the outer housing of the connector sleeve of FIG. 8.

FIG. 10 shows an alternative embodiment of outer housing 174' in duplex format for receiving two inner housings 172 and thus two connectors 64. Pairs of outer latch arms 208' are located to retain an inner housing 172.

Although the present invention has been described with respect to a preferred and same alternative embodiments, it should be understood that various changes, substitutions and modifications may be suggested to one skilled in the art and its is intended that the present invention encompass such changes, substitutions and modifications as fall within the scope of the appended claims.

That which is claimed is:

1. A connector and connector sleeve assembly comprising:
    (a) a connector sleeve with a first half and a second half and a ferrule alignment portion spanning from the first half to the second half, the first half configured to operatively connect and disconnect with a first fiber optic connector of a first design, the second half of the connector sleeve having a cylindrical sleeve portion defining a second receptacle; and
    (b) a second connector having a second design that is different from the first design, the connector having an optical fiber ferrule portion with an end face and a body portion rearward of the end face of the ferrule, the body portion and the ferrule portion being fixed relative to each other, the body portion removably engaged with the sleeve portion of the second half such that the end face of the ferrule portion is disposed in the ferrule alignment portion of the connector sleeve and fixed relative to the connector sleeve, the body portion having an enlarged portion grippable by fingers such that the second connector is readily removable from the second receptacle without a tool.

2. The assembly of claim 1 further comprising a ferrule alignment sleeve disposed in the alignment sleeve portion and spanning from the first half to the second half and positioned to receive two ferrules therein.

3. The assembly of claim 2 wherein the second receptacle is sized to allow sliding of the ferrule alignment sleeve therethrough into the alignment sleeve portion and wherein the connector sleeve defines a shoulder surface facing axially toward the alignment sleeve portion to axially capture the alignment sleeve on the side toward the first half of the connector sleeve.

4. The assembly of claim 1 farther comprising the first connector operatively connected to the first half of the connector sleeve.

5. The assembly of claim 4 wherein the first connector has a ferrule spring mounted in a housing and the housing connected to the connector sleeve such that the ferrule end face is disposed in the ferrule alignment portion against the end face of the ferrule portion of the second connector and wherein the ferrule of the first connector is movable in the axial direction relative to the connector sleeve against the spring force upon connection of the first connector such that the end faces of the ferrule and the ferrule portion are biased against each other.

6. The assembly of claim 1 wherein the sleeve portion of the second half defines a bayonet cut-out with at least an axial extending portion and a circumferentially extending portion and wherein the body portion of the second connector has a protrusion extending radially outward and is slidable through the bayonet cut-out to removably connect the body portion to the sleeve portion of the second half.

7. The assembly of claim 6 wherein the sleeve portion defines two diametrically opposed bayonet cut-outs and the second connector had two diametrically opposed protrusions.

8. The assembly of claim 1 wherein the grippable portion is generally tab shaped having opposed concave surfaces to facilitate gripping.

9. The assembly of claim 1 wherein the second connector is of one-piece molded construction.

10. The assembly of claim 1 wherein the ferrule portion of the second connector is a separate piece from the body portion and wherein the body portion defines a ferrule bore extending axially therein for receiving the ferrule therein and wherein the ferrule portion is fixed in the ferrule bore of the body portion.

11. The assembly of claim 10 wherein the body portion if made of a polymer material and the ferrule portion is of a different more precise polymer material than the body portion and the ferrule portion is ultrasonically welded in the ferrule bore.

12. The assembly of claim 10 wherein the ferrule portion is of ceramic and the body portion is of a polymer material and the ferrule portion is insert molded in the body portion.

13. The assembly of claim 1 wherein the first half is configured to connect and disconnect to an SC connector.

14. The assembly of claim 13 wherein the connector sleeve has an inner housing with a first half and a second half, the first half having latch arms to engage an SC connector and the second half having a sleeve portion defining a bayonet cut-out with at least an axially extending portion and a circumferentially extending portion and wherein the body portion of the second connector has a protrusion extending radially outward to be received in the bayonet cut-out upon insertion of the second connector in the sleeve portion of the second half.

15. The assembly of claim 14 wherein the connector sleeve further comprises an outer housing that receives the inner housing therein, the outer housing having a first half for receiving an SC connector therein and a second half having a pair of outer latch arms, and wherein the second half of the inner housing has flange portions extending radially outward to be captured by the outer latch arms of the second half of the outer housing.

16. The assembly of claim 14 wherein the inner housing is of one piece construction and the outer housing is of one piece construction and the inner housing is snap fit in the outer housing.

17. The assembly of claim 16 wherein the inner housing can be removed from the outer housing.

18. The assembly of claim 1 wherein the first half of the connector sleeve is configured to connect and disconnect to an ST type connector and wherein the second half of the connector sleeve has a sleeve portion defining a bayonet cut-out having at least an axially extending portion and a circumferentially extending portion and wherein body portion of the second connector has a protrusion extending radially outward and is slidably received in the bayonet cut-out to connect the second connector to the sleeve portion of the second half of the connector sleeve.

19. A fiber optic connector, comprising:

a ferrule portion having an end face and defining a ferrule bore longitudinally therethrough to receive an optical fiber for termination at the end face;

a body portion rearward of the end face of the ferrule and fixed to the ferrule portion, the body portion having an enlarged portion of a generally paddle shape to facilitate gripping of the enlarged portion by finger, the body portion defining an axial passageway therethrough that communicates with the ferrule bore to receive an optical fiber therethrough for insertion into the ferrule bore.

20. The connector of claim 19 wherein the enlarged portion has opposed concave surfaces to facilitate finger gripping.

21. The connector of claim 19 wherein the body portion has a protrusion extending radially outward to cooperate and rotate in a bayonet cut-out of a connector sleeve.

22. The connector of claim 19 wherein the connector is of one-piece molded construction.

23. A connector and connector sleeve assembly comprising:

(a) a connector sleeve with a first half and a second half and a ferrule alignment portion spanning from the first half to the second half, the first half configured to operatively connect and disconnect with a first fiber optic connector of a first design, the second half of the connector sleeve having a cylindrical sleeve portion defining a second receptacle, the sleeve portion defining a bayonet cut-out with at least an axially extending portion and a circumferentially extending portion; and (b) a second connector having a second design that is different from the first design, the connector having an optical fiber ferrule portion with an end face and a body portion rearward of the end face of the ferrule, the body portion and the ferrule portion being fixed relative to each other, the body portion removably engaged with the sleeve portion of the second half such that the end face of the ferrule portion is disposed in the ferrule alignment portion of the connector sleeve and fixed relative to the connector sleeve, the body portion having a bayonet protrusion extending radially outward for slideable engagement with the bayonet cut-out.

24. A fiber optic connector, comprising:

(a) a ferrule portion having an endface and defining a ferrule bore longitudinally therethrough to receive an optical fiber for termination at the end face;

(b) a body portion rearward of the end face of the ferrule and fixed to the ferrule portion, the body portion defining an axial passageway therethrough for insertion into the ferrule bore, the body portion having a protrusion extending radially outward to cooperate and rotate in a bayonet cut-out defined in a connector sleeve.

* * * * *